US012563389B2

(12) United States Patent
Elshafie et al.

(10) Patent No.: US 12,563,389 B2
(45) Date of Patent: Feb. 24, 2026

(54) PHYSICAL (PHY) LAYER SECURITY

(71) Applicant: QUALCOMM Incorporated, San Diego, CA (US)

(72) Inventors: Ahmed Elshafie, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 18/292,003

(22) PCT Filed: Aug. 17, 2022

(86) PCT No.: PCT/US2022/075065
§ 371 (c)(1),
(2) Date: Jan. 25, 2024

(87) PCT Pub. No.: WO2023/049565
PCT Pub. Date: Mar. 30, 2023

(65) Prior Publication Data
US 2024/0334187 A1 Oct. 3, 2024

(30) Foreign Application Priority Data
Sep. 27, 2021 (GR) .............................. 20210100635

(51) Int. Cl.
*H04W 12/0431* (2021.01)
*H04W 12/08* (2021.01)

(52) U.S. Cl.
CPC ....... *H04W 12/0431* (2021.01); *H04W 12/08* (2013.01)

(58) Field of Classification Search
None
See application file for complete search history.

(56) References Cited

U.S. PATENT DOCUMENTS

2003/0086364 A1* 5/2003 Horne ..................... H04J 13/16
370/441
2012/0008556 A1 1/2012 Noh et al.
(Continued)

FOREIGN PATENT DOCUMENTS

CN 111556072 A * 8/2020 ........... H04L 63/062

OTHER PUBLICATIONS

International Search Report and Written Opinion—PCT/US2022/075065—ISA/EPO—Dec. 5, 2022.
(Continued)

*Primary Examiner* — Michael Pyzocha
(74) *Attorney, Agent, or Firm* — Patterson + Sheridan, L.L.P.

(57) ABSTRACT

Certain aspects of the present disclosure provide techniques for securing physical (PHY) layers in wireless communication. Certain aspects are directed to a method for wireless communication by a base station (BS). In some examples, includes, by, a secured first index based at least in part on a first index and a first secret key, the first index corresponding to a first orthogonal cover code (OCC) for communication over at least a first channel between the BS and a user equipment (UE). In some examples, the method also includes transmitting, to the UE, the secured first index and the first secret key.

30 Claims, 11 Drawing Sheets

(56) References Cited

U.S. PATENT DOCUMENTS

| | | | | |
|---|---|---|---|---|
| 2019/0149545 | A1* | 5/2019 | Arora | H04W 12/06 |
| | | | | 726/7 |
| 2020/0186310 | A1* | 6/2020 | Yang | H04L 27/2621 |
| 2022/0015097 | A1* | 1/2022 | Huang | H04J 13/107 |
| 2022/0303840 | A1* | 9/2022 | Chang | H04W 12/041 |
| 2024/0137758 | A1* | 4/2024 | Dai | H04W 12/04 |

OTHER PUBLICATIONS

Jang J., et al., "5G, NR, Medium Access Control (MAC) Protocol Specification (3GPP TS 38.321 Version 16.5.0 Release 16) NR, Medium Access Control (MAC) Protocol Specification", Jul. 7, 2021, pp. 1-159, XP093001595, Section 4.3, Services.

Lopez M.M., et al., "Orthogonal Cover Code Design for 802.11be Extremely High Throughput WLANs", 2019 53rd Asilomar Conference on Signals, Systems and Computers, IEEE, Nov. 3, 2019, pp. 655-659, XP033750787, abstract.

Xing X., et al., "Security Analysis and Authentication Improvement for IEEE 802.11i Specification", 2008 IEEE Global Telecommunications Conference: [IEEE Globecom 2008], New Orleans, Louisiana, Nov. 30, 2008-Dec. 4, 2008, IEEE, Piscataway, NJ, USA, Nov. 30, 2008, pp. 1-5, XP031370048, ISBN: 978-1-4244-2324-8, Section III.B Figure 1.

* cited by examiner

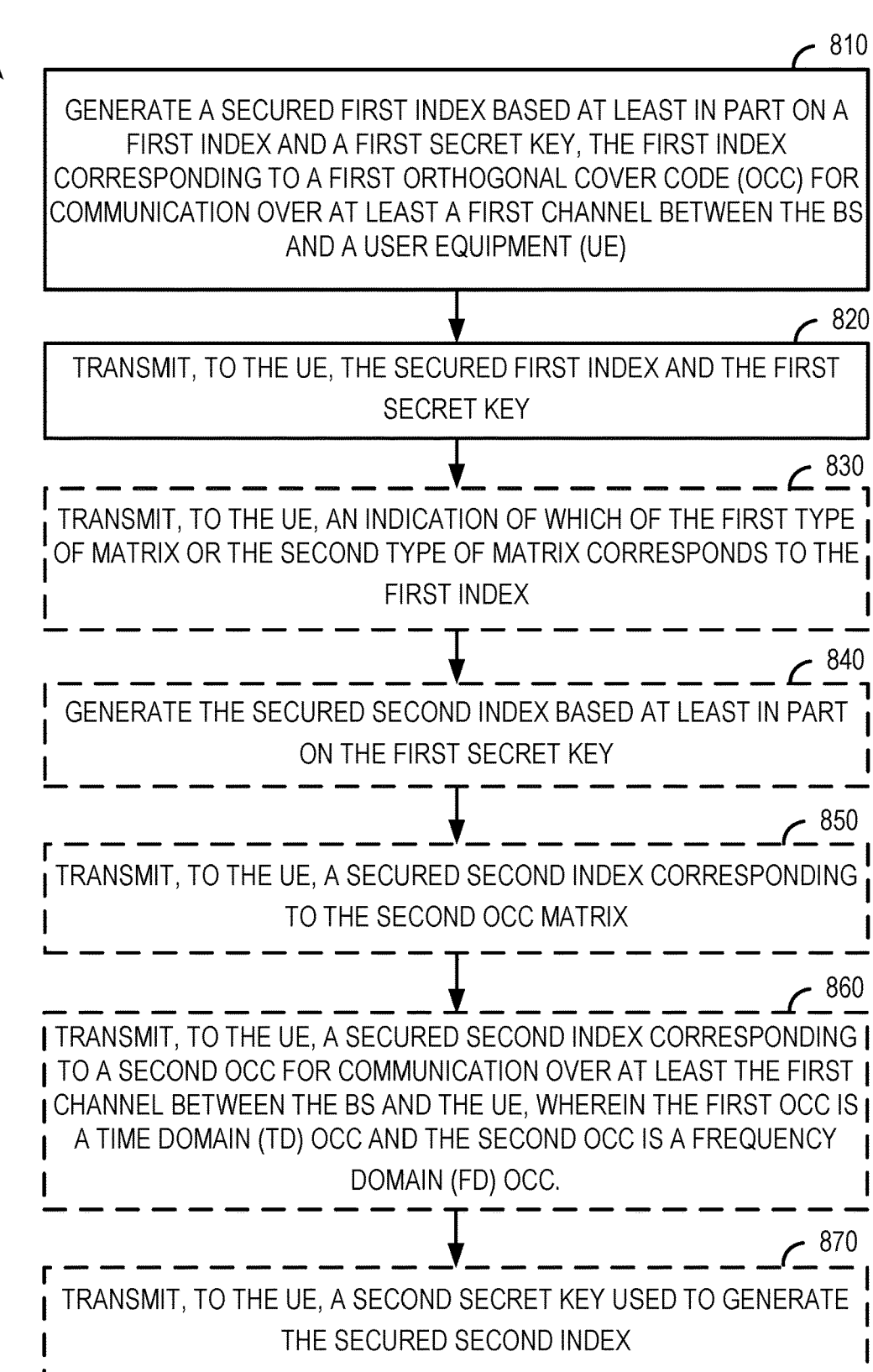

800

810

GENERATE A SECURED FIRST INDEX BASED AT LEAST IN PART ON A FIRST INDEX AND A FIRST SECRET KEY, THE FIRST INDEX CORRESPONDING TO A FIRST ORTHOGONAL COVER CODE (OCC) FOR COMMUNICATION OVER AT LEAST A FIRST CHANNEL BETWEEN THE BS AND A USER EQUIPMENT (UE)

820

TRANSMIT, TO THE UE, THE SECURED FIRST INDEX AND THE FIRST SECRET KEY

830

TRANSMIT, TO THE UE, AN INDICATION OF WHICH OF THE FIRST TYPE OF MATRIX OR THE SECOND TYPE OF MATRIX CORRESPONDS TO THE FIRST INDEX

840

GENERATE THE SECURED SECOND INDEX BASED AT LEAST IN PART ON THE FIRST SECRET KEY

850

TRANSMIT, TO THE UE, A SECURED SECOND INDEX CORRESPONDING TO THE SECOND OCC MATRIX

860

TRANSMIT, TO THE UE, A SECURED SECOND INDEX CORRESPONDING TO A SECOND OCC FOR COMMUNICATION OVER AT LEAST THE FIRST CHANNEL BETWEEN THE BS AND THE UE, WHEREIN THE FIRST OCC IS A TIME DOMAIN (TD) OCC AND THE SECOND OCC IS A FREQUENCY DOMAIN (FD) OCC.

870

TRANSMIT, TO THE UE, A SECOND SECRET KEY USED TO GENERATE THE SECURED SECOND INDEX

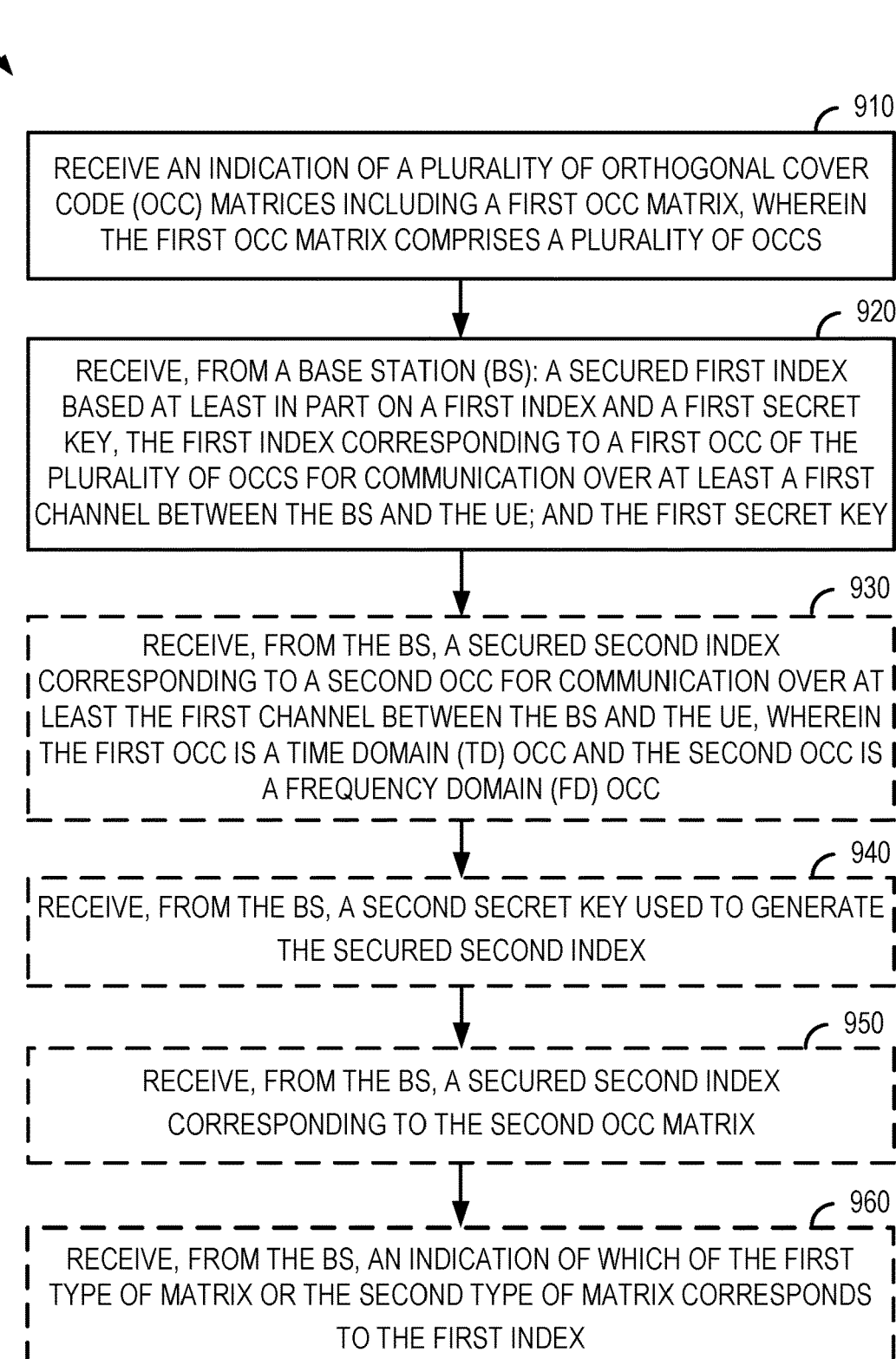

910

RECEIVE AN INDICATION OF A PLURALITY OF ORTHOGONAL COVER CODE (OCC) MATRICES INCLUDING A FIRST OCC MATRIX, WHEREIN THE FIRST OCC MATRIX COMPRISES A PLURALITY OF OCCS

920

RECEIVE, FROM A BASE STATION (BS): A SECURED FIRST INDEX BASED AT LEAST IN PART ON A FIRST INDEX AND A FIRST SECRET KEY, THE FIRST INDEX CORRESPONDING TO A FIRST OCC OF THE PLURALITY OF OCCS FOR COMMUNICATION OVER AT LEAST A FIRST CHANNEL BETWEEN THE BS AND THE UE; AND THE FIRST SECRET KEY

930

RECEIVE, FROM THE BS, A SECURED SECOND INDEX CORRESPONDING TO A SECOND OCC FOR COMMUNICATION OVER AT LEAST THE FIRST CHANNEL BETWEEN THE BS AND THE UE, WHEREIN THE FIRST OCC IS A TIME DOMAIN (TD) OCC AND THE SECOND OCC IS A FREQUENCY DOMAIN (FD) OCC

940

RECEIVE, FROM THE BS, A SECOND SECRET KEY USED TO GENERATE THE SECURED SECOND INDEX

950

RECEIVE, FROM THE BS, A SECURED SECOND INDEX CORRESPONDING TO THE SECOND OCC MATRIX

960

RECEIVE, FROM THE BS, AN INDICATION OF WHICH OF THE FIRST TYPE OF MATRIX OR THE SECOND TYPE OF MATRIX CORRESPONDS TO THE FIRST INDEX

*FIG. 9*

PHYSICAL (PHY) LAYER SECURITY

CROSS-REFERENCE TO RELATED APPLICATION(S)

This application is a national stage application under 35 U.S.C. 371 of PCT/US2022/075065, filed Aug. 17, 2022, which claims benefit of and priority to Greece application No. 20210100635 filed Sep. 27, 2021, which are assigned to the assignee hereof and incorporated by reference herein in its entirety their entireties.

INTRODUCTION

Aspects of the present disclosure relate to wireless communications, and more particularly, to techniques for securing physical (PHY) layer communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, as the number of devices using wireless communication systems continues to increase, securing communications between devices becomes even more challenging. Consequently, there exists a need for further improvements in wireless communications systems to overcome various challenges.

SUMMARY

One aspect provides a method for wireless communication by a base station (BS). In some examples, the method includes generating a secured first index based at least in part on a first index and a first secret key, the first index corresponding to a first orthogonal cover code (OCC) for communication over at least a first channel between the BS and a user equipment (UE). In some examples, the method includes transmitting, to the UE, the secured first index and the first secret key.

One aspect provides a method for wireless communication by a user equipment (UE). In some examples, the method includes receiving an indication of one or more orthogonal cover code (OCC) matrices including a first OCC matrix, wherein the first OCC matrix comprises a plurality of OCCs. In some examples, the method includes receiving, from a base station (BS): a secured first index based at least in part on a first index and a first secret key, the first index corresponding to a first OCC of the plurality of OCCs for communication over at least a first channel between the BS and the UE; and the first secret key.

One aspect provides a base station (BS) comprising a memory and a processor coupled to the memory. In some examples, the processor and the memory are configured to generate a secured first index based at least in part on a first index and a first secret key, the first index corresponding to a first orthogonal cover code (OCC) for communication over at least a first channel between the BS and a user equipment (UE). In some examples, the processor and the memory are configured to transmit, to the UE, the secured first index and the first secret key.

One aspect provides a user equipment (UE) comprising a memory and a processor coupled to the memory. In some examples, the processor and the memory are configured to receive an indication of one or more orthogonal cover code (OCC) matrices including a first OCC matrix, wherein the first OCC matrix comprises a plurality of OCCs. In some examples, the processor and the memory are configured to receive, from a base station (BS): a secured first index based at least in part on a first index and a first secret key, the first index corresponding to a first OCC of the plurality of OCCs for communication over at least a first channel between the BS and the UE; and the first secret key.

One aspect provides a base station (BS). In some examples, the BS includes means for generating a secured first index based at least in part on a first index and a first secret key, the first index corresponding to a first orthogonal cover code (OCC) for communication over at least a first channel between the BS and a user equipment (UE). In some examples, the BS includes means for transmitting, to the UE, the secured first index and the first secret key.

One aspect provides a user equipment (UE). In some examples, the UE includes means for receiving an indication of one or more orthogonal cover code (OCC) matrices including a first OCC matrix, wherein the first OCC matrix comprises a plurality of OCCs. In some examples, the UE includes means for receiving, from a base station (BS): a secured first index based at least in part on a first index and a first secret key, the first index corresponding to a first OCC of the plurality of OCCs for communication over at least a first channel between the BS and the UE; and the first secret key.

One aspect provides a non-transitory computer-readable medium having instructions stored thereon that, when executed by a base station (BS), cause the BS to perform operations. In some examples, the operations include generating a secured first index based at least in part on a first index and a first secret key, the first index corresponding to a first orthogonal cover code (OCC) for communication over at least a first channel between the BS and a user equipment (UE). In some examples, the operations include transmitting, to the UE, the secured first index and the first secret key.

One aspect provides a non-transitory computer-readable medium having instructions stored thereon that, when executed by a user equipment (UE), cause the UE to perform operations. In some examples, the operations include receiving an indication of one or more orthogonal cover code (OCC) matrices including a first OCC matrix, wherein the first OCC matrix comprises a plurality of OCCs. In some examples, the operations include receiving, from a base station (BS): a secured first index based at least in part on a first index and a first secret key, the first index corresponding to a first OCC of the plurality of OCCs for communication over at least a first channel between the BS and the UE; and the first secret key.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 8 is a flow diagram illustrating example operations for wireless communication.

FIG. 9 is a flow diagram illustrating example operations for wireless communication.

DETAILED DESCRIPTION

Aspects of the present disclosure provide apparatuses, methods, processing systems, and computer-readable mediums for securing physical (PHY) layer communications.

As described in more detail below, a single base station (BS) can wirelessly communicate (e.g., transmit and receive downlink and uplink communications) with multiple user equipments (UEs). For example, the BS may use multiple-user multiple-input multiple-output (MU-MIMO) for such communication. However, some devices may be capable of eavesdropping on wireless communications between the BS and a UE. For example, a device, such as an eavesdropping UE, may receive downlink transmissions from the BS and/or uplink transmissions from another UE despite the eavesdropping UE not being an intended part of the communication. If the PHY layer of the uplink and downlink communications is not secure, the eavesdropping UE may be capable of decoding the communications, such as if no upper layer (e.g., application layer) security is used for the communications.

Thus, a PHY layer security scheme may prevent other devices from decoding data that is not intended for them. In one example, an orthogonal cover code (OCC) may be used to encode aspects of a communication. For example, a UE and/or a BS may encode one or more of a reference signal (e.g., DM-RS, SRS, etc.), a physical uplink channel (e.g., physical uplink control channel (PUCCH), physical uplink shared channel (PUSCH), etc.), a physical downlink channel (e.g., physical downlink control channel (PDCCH), physical downlink shared channel (PDSCH), etc.), or the like in an uplink or downlink transmission. In this example, the BS may configure the UE with OCC information so that both the UE and the BS are capable of encoding and decoding communications with the other using the same OCC. In some cases, the OCC information may include an OCC matrix and an index identifying a particular OCC vector or sequence in that matrix.

To prevent other devices from understanding the index used by a UE and a BS in a legitimate communication, the BS may encode the index prior to communicating the index to the intended UE. Such an encoding may prevent other devices from determining not only the channel used by a UE or a BS, but also which UE in a MU-MIMO environment is communicating which signals.

Introduction to Wireless Communication Networks

Figure 1:
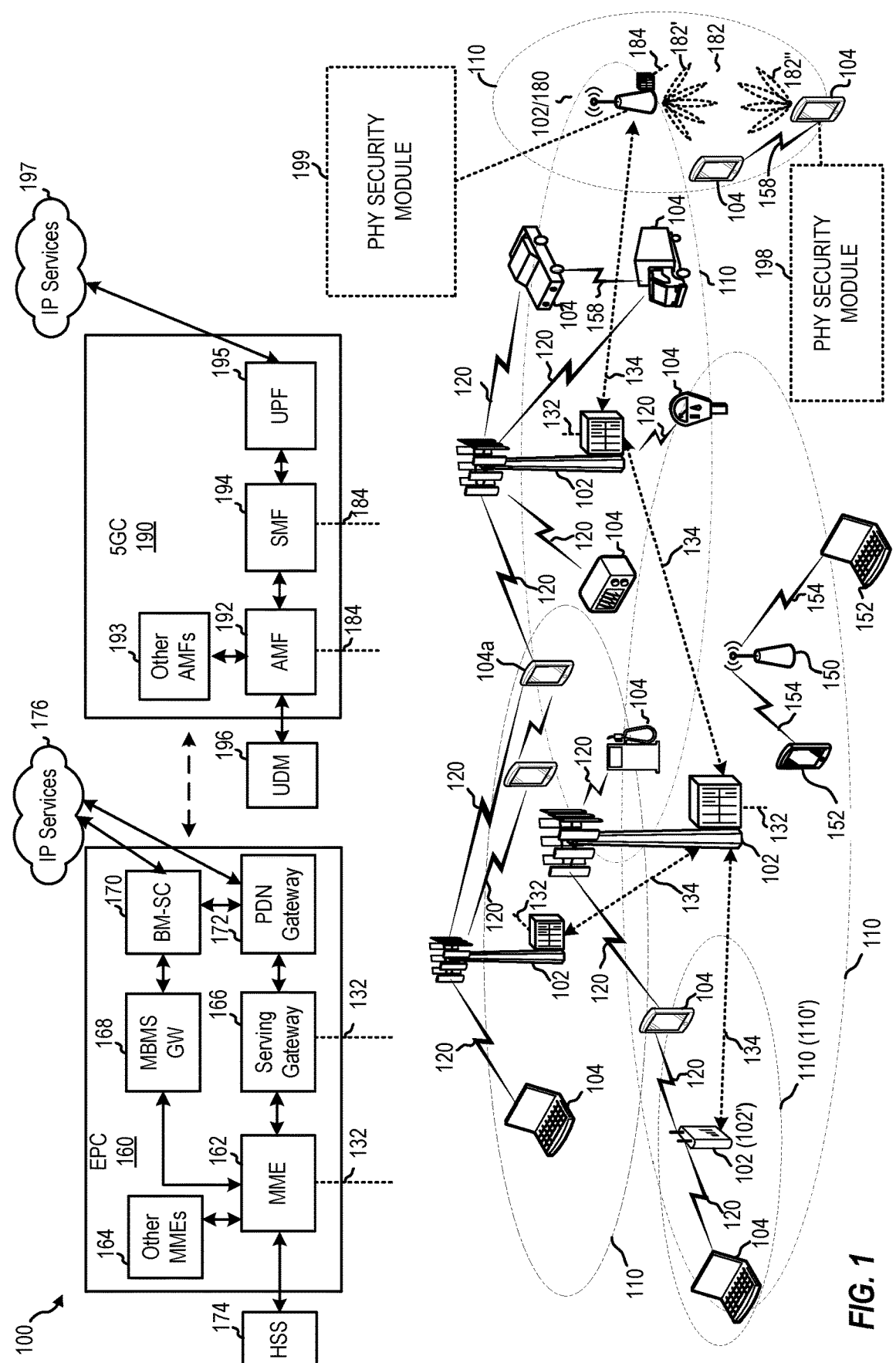
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipment (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as MU-MIMO. This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, transmit and receive directions for base station 180 may or may not be the same. Similarly, transmit and receive directions for UE 104 may or may not be the same.

Wireless communication system 100 includes a PHY security module 199, which may be configured to secure PHY layer communications. Wireless network 100 further includes a PHY security module 198, which may be used configured to secure PHY layer communications.

Figure 2:
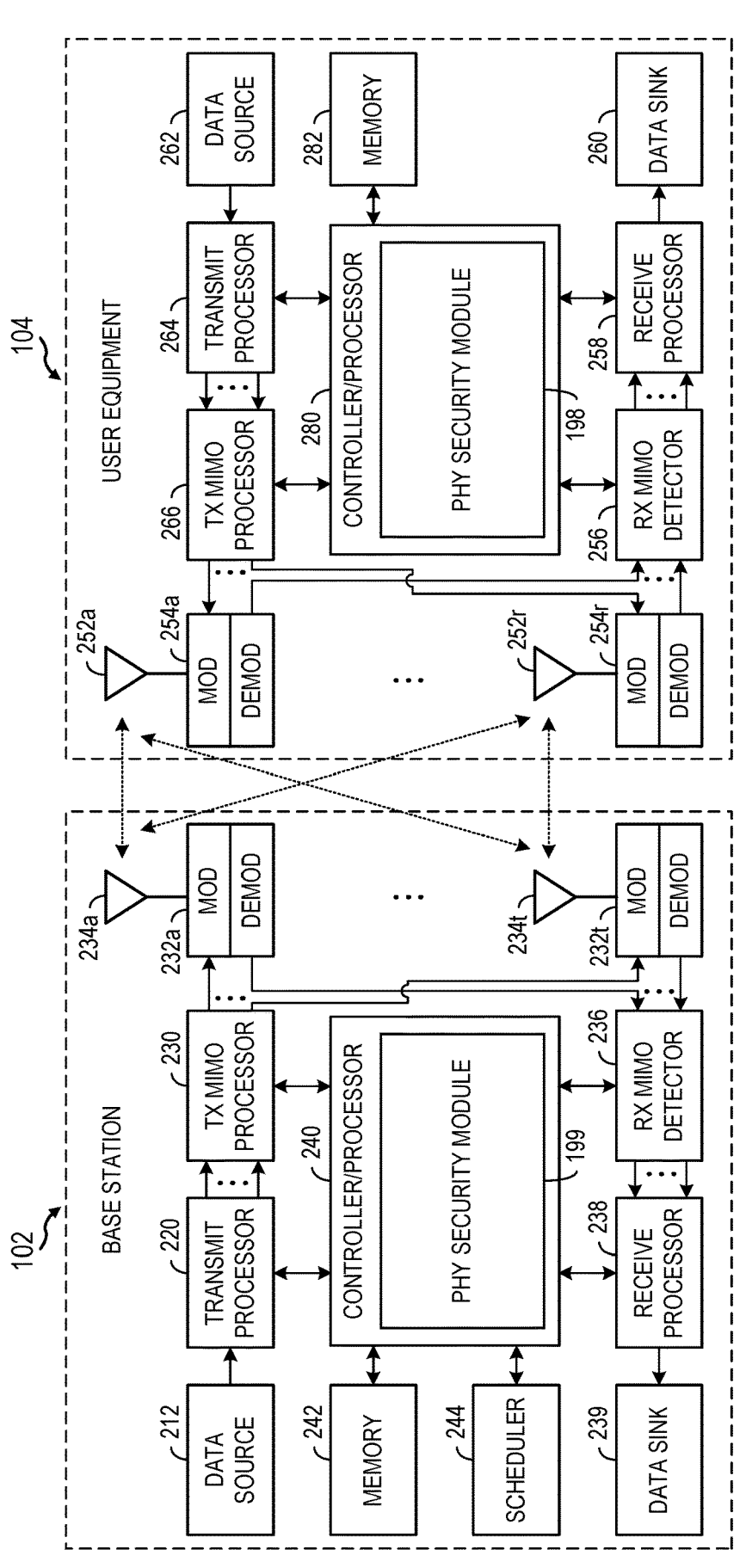
FIG. 2 is a block diagram conceptually illustrating aspects of an example of a base station (BS) and user equipment (UE).

FIG. 2 is a block diagram illustrating aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and UE 104.

Base station 102 includes controller/processor 240, which may be configured to implement various functions related to wireless communications. In the depicted example, controller/processor 240 includes the PHY security module 199. Notably, while depicted as an aspect of controller/processor 240, PHY security module 199 may be implemented additionally or alternatively in various other aspects of base station 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes the PHY security module 198. Notably, while depicted as an aspect of controller/processor 280, the PHY security module 198 may be implemented additionally or alternatively in various other aspects of UE 104 in other implementations.

Figure 3:
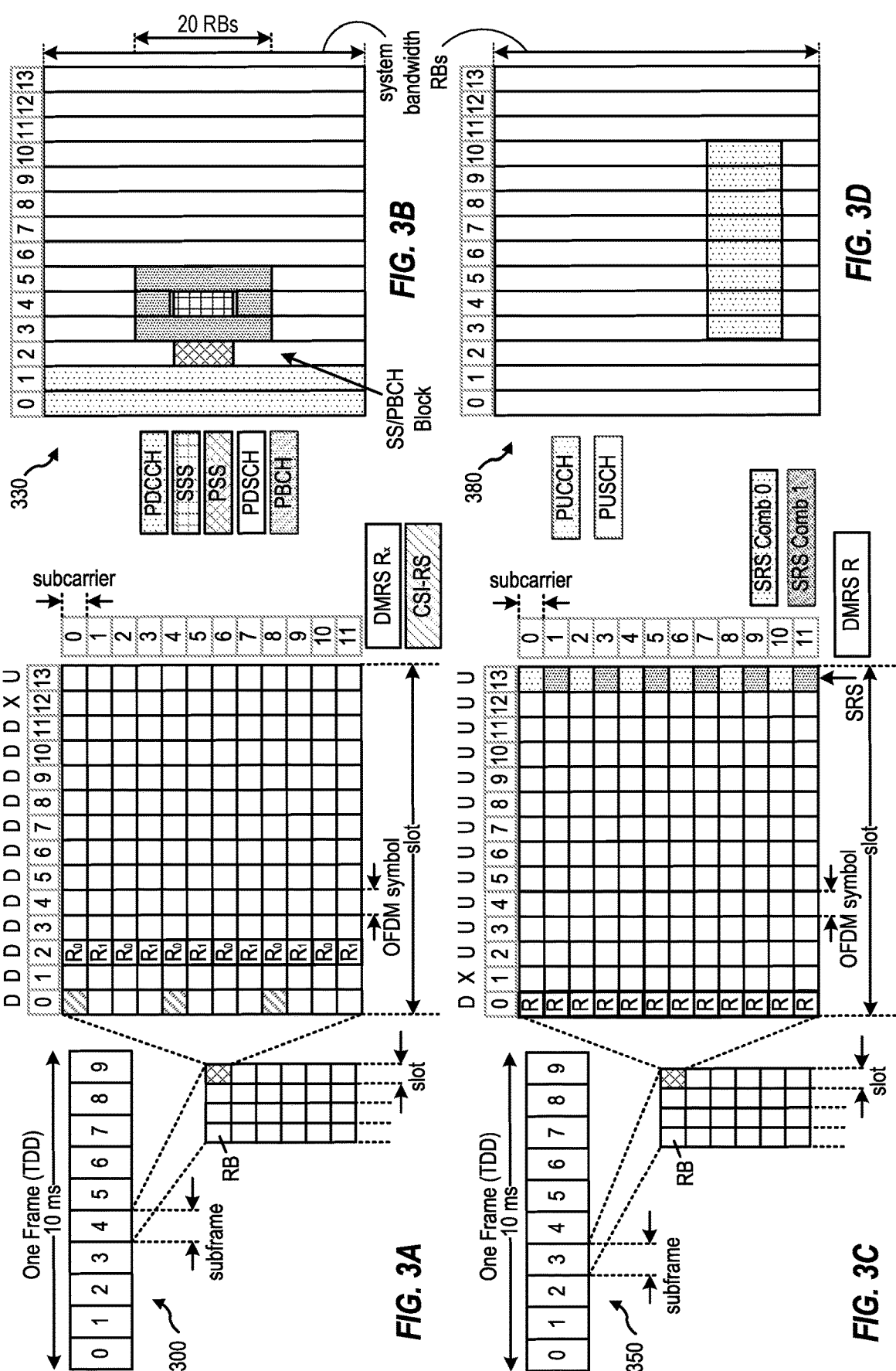
FIGS. 3A-3D depict various example aspects of data structures for a wireless communication network.

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

According to aspects of the present disclosure, a UE may be configured to transmit reference signals (e.g., DM-RSs, SRSs, etc.) for all configured transmit antenna ports using multiple OFDM symbols of one slot, time-domain orthogonal cover codes (TD-OCC), one or more transmission combs, and/or one or more cyclic shifts.

Figure 4:
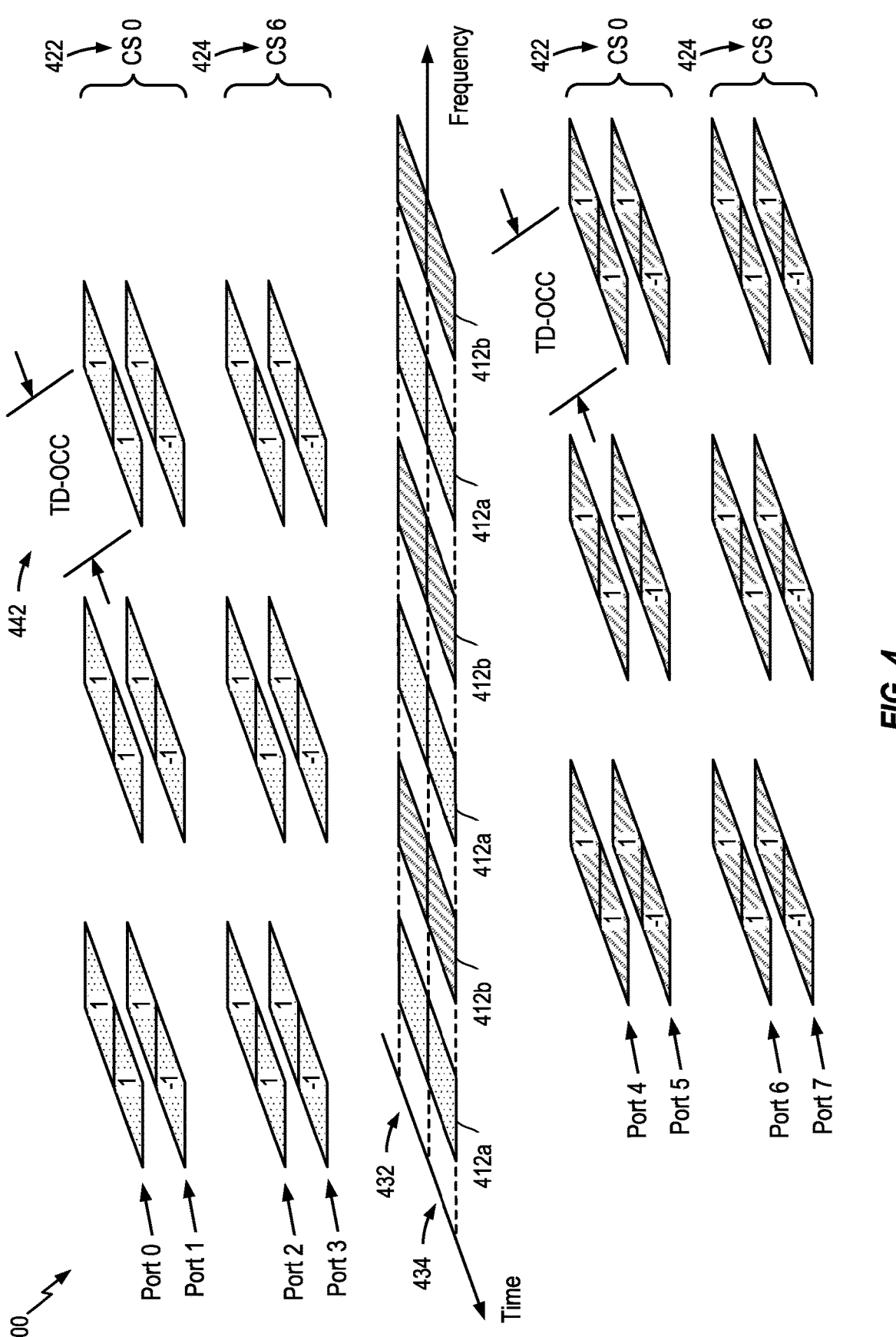
FIG. 4 is a block diagram illustrating multiple symbols encoded with a time-domain orthogonal cover code (TD-OCC).

FIG. 4 is a block diagram illustrating multiple symbols encoded with a TD-OCC. Specifically, FIG. 4 relates to an exemplary technique 400 for a UE (e.g., UE 104 shown in FIGS. 1 and 2) to transmit double-symbol SRS using various ports using two OFDM symbols 432, 434 of one slot, time-domain orthogonal cover codes (TD-OCC) 442, one or more transmission combs 412, and one or more cyclic shifts 422, 424.

In the exemplary technique 400, the UE 104 can be configured to transmit SRS using 8 ports using 2 out of 4 transmission combs 412*a* and 412*b* and 2 cyclic shifts 422 and 424 (e.g., cyclic shifts 0 and 6). On each comb, SRS using 4 ports are multiplexed using 2 different cyclic shifts 422, 424 and a size-2 TD-OCC 442. In the exemplary technique 400, each cyclic shift is associated with 2 ports, and 2 ports using the same cyclic shift are multiplexed using the TD-OCC. While the exemplary technique 400 shows SRS transmitted on 2 ports using the same cyclic shifts being multiplexed using TD-OCC, the present disclosure is not so limited, and SRS on ports transmitted using TD-OCC may use differing cyclic shifts. Thus, an SRS for each port is orthogonal to the SRS for all other ports because each port is transmitted using a different combination of cyclic shift, transmission comb, and TD-OCC.

According to aspects of the present disclosure, SRSs for all configured transmit antenna ports can be transmitted using one CP-OFDM symbol of one slot with a frequency-domain orthogonal cover code (FD-OCC) in multiple consecutive REs in an RB.

Figure 5:
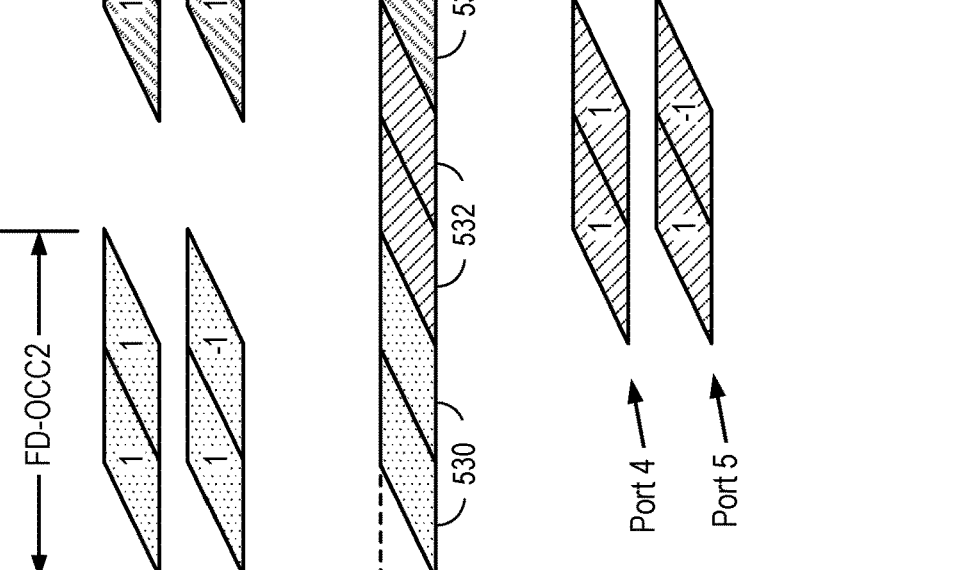
FIG. 5 is a block diagram illustrating consecutive resource elements (REs) encoded with a frequency-domain orthogonal cover code (FD-OCC).

FIG. 5 is a block diagram illustrating consecutive REs encoded with a FD-OCC. Specifically, FIG. 5 illustrates an exemplary technique 500 for a UE (e.g., UE 104 shown in FIGS. 1 and 2) to transmit SRS using various ports using one CP-OFDM symbol 510 of one slot with a frequency-domain orthogonal cover code (FD-OCC) 520 in multiple pairs 530, 532, 534, 536 of consecutive REs in an RB. In the exemplary technique 500, SRS on ports {2n, 2n+1} are transmitted on 2 consecutive REs using a size-2 FD-OCC 520, where n=0, 1, 2, 3. Thus, an SRS for each port is orthogonal to the SRS for all other ports because each port is transmitted using a different combination of FD-OCC and pair of REs.

According to aspects of the present disclosure, SRSs for all configured transmit antenna ports can be transmitted using multiple consecutive CP-OFDM symbols of one slot, consecutive REs, and two-dimensional orthogonal cover codes (OCC).

Figure 6:
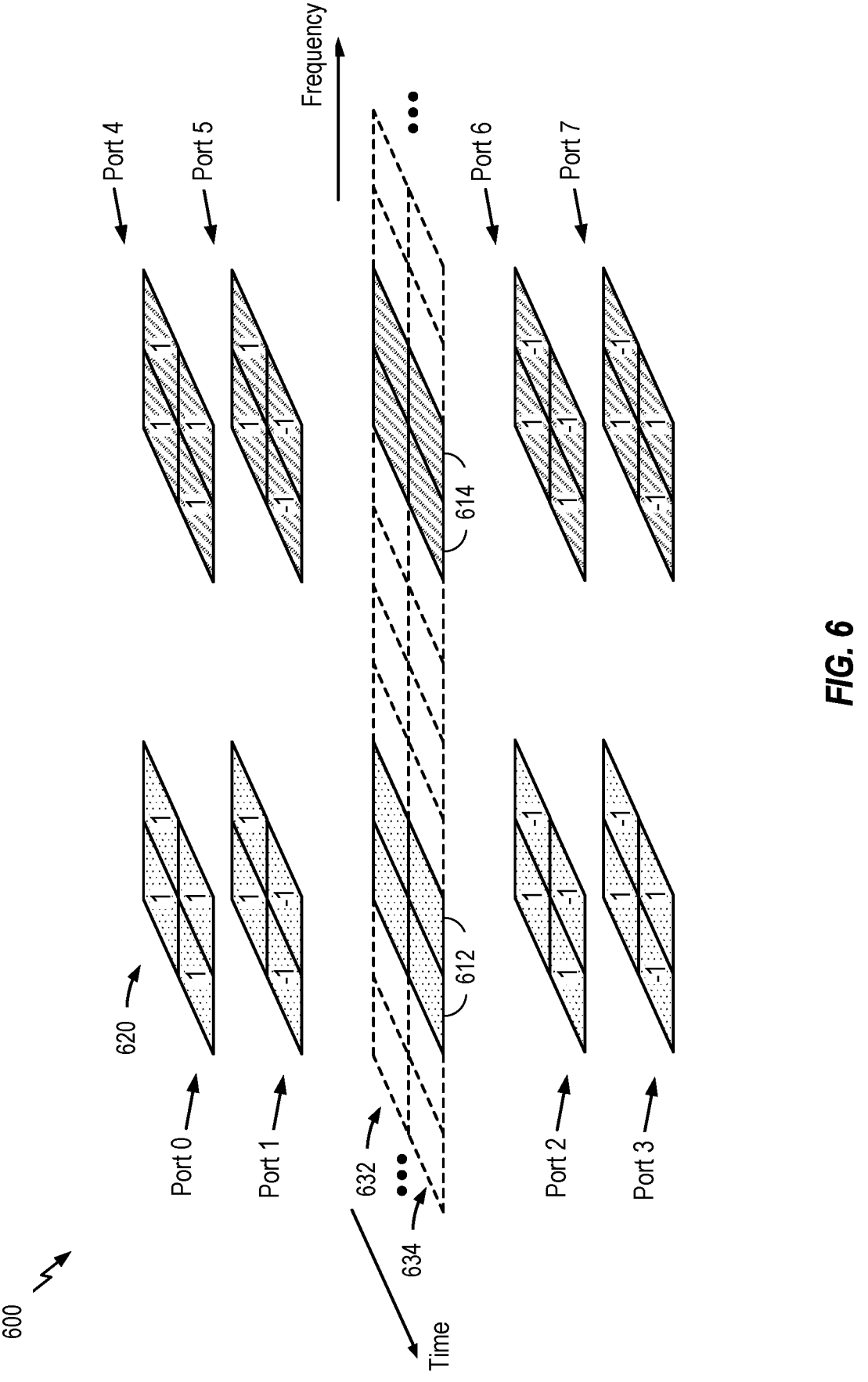
FIG. 6 is a block diagram illustrating consecutive REs in multiple consecutive symbols encoded using code division multiplexing (CDM).

FIG. 6 is a block diagram illustrating consecutive REs in multiple consecutive symbols encoded using code division multiplexing (CDM) (i.e., orthogonal cover codes). Specifically, FIG. 6 illustrates an exemplary technique 600 for a UE (e.g., UE 104 shown in FIGS. 1 and 2) to transmit SRS using various ports using multiple consecutive CP-OFDM symbols 632, 634 of one slot, consecutive REs 612, 614, and orthogonal cover codes (OCC) 620. In the exemplary technique 600, ports {4n, 4n+1, 4n+2, 4n+3} are transmitted on a set of consecutive REs 612 (for n=0) or 614 (for n=1) of 2 consecutive REs in 2 consecutive symbols 632, 634 using a four element orthogonal cover code 620. An SRS for each port is orthogonal to the SRS for all other ports because each port is transmitted using a different combination of REs and OCC.

Aspects Related to Physical (PHY) Layer Security

As illustrated in FIG. 1, a single BS 102 can wirelessly communicate with multiple UEs 104. However, another UE 104a may be able to eavesdrop on wireless communications (e.g., downlink and uplink communications) between UEs 104 and the BS 102. Accordingly, a PHY layer security scheme may prevent devices from decoding data that is not intended for the devices.

In one example, an orthogonal cover code (OCC) may be used to encode one or more signals, such as one or more of a DM-RS, an SRS, a PUCCH, a PUSCH, a PDCCH, or a PDSCH in a communication between a UE 104 and a BS 102. The BS 102 may configure the UE 104 with an OCC matrix and an index identifying a particular OCC vector or sequence in that matrix. The UE 104 and BS 102 may then encode their respective communications according to the identified OCC vector. However, if the other UE 104a is able to determine the identified OCC vector, then the other UE 104a may be able to decode communications between the UE 104 and BS 102.

Thus, in certain aspects, the BS 102 may encode the index prior to communicating the index to the intended UE 104 to prevent the other UE 104a from determining the corresponding OCC vector. In this example, such an encoding may prevent the other UE 104a from determining not only the channel used by the UE 104 or BS 102, but also which UE in a multiple-user multiple-input multiple-output (MU-MIMO) environment is communicating which signals.

Figure 7:
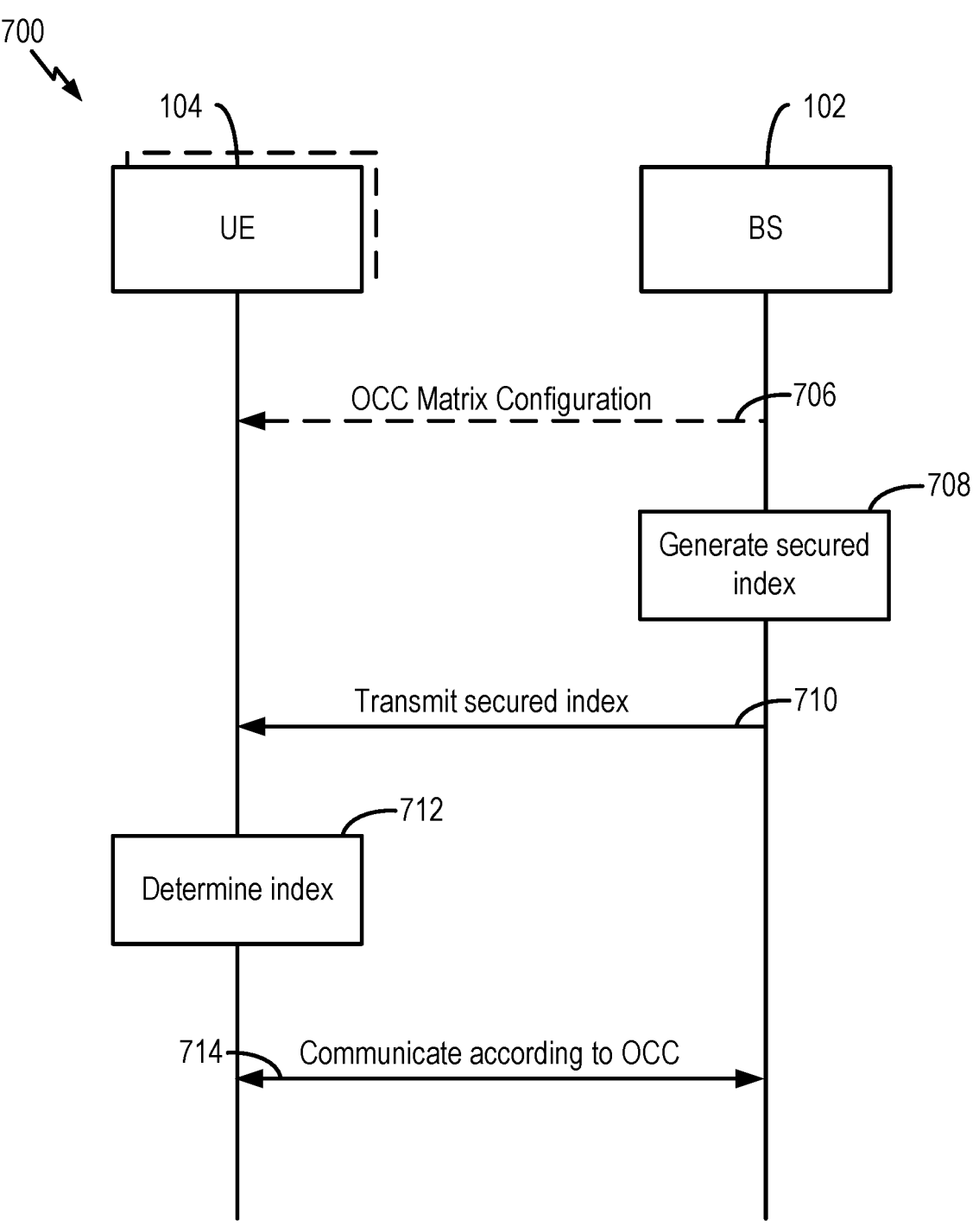
FIG. 7 is a call-flow diagram illustrating example communications between a BS and a UE, according to aspects of the present disclosure.

FIG. 7 is a call-flow diagram illustrating example communications 700 between a BS 102 and a UE 104, according to aspects of the present disclosure. The communications and processes may be performed in a MU-MIMO environment.

In a first communication 706, the BS 102 may configure the UE 104 with one or more OCC matrices via RRC signaling. If the UE 104 does not already have one or more of the matrices used by the BS 102, the BS 102 may provide the UE 104 with the matrices in the first communication 706. The UE 104 may then store the one or more matrices in a digital storage or memory (e.g., memory 282 of FIG. 2) so that downlink transmissions can be decoded, and uplink transmissions can be encoded according to the one or more matrices. Alternatively, the UE 104 may be preconfigured with the one or more OCC matrices. For example, the OCC matrices may be defined by a telecommunication standard.

If the UE 104 already has the one or more matrices stored, then the first communication 706 may include an indication of which of the one or more matrices to use for a communication. For example, the BS 102 may provide signaling identifying a particular one or more matrices during a random access channel (RACH) procedure and/or in a broadcast message (e.g., a system information block (SIB) or master information block (MIB)). The UE 104 may then use the identified one or more matrices to encode and decode communications with the BS 102.

In some examples, the one or more OCC matrices may include a plurality of different types of matrices, such as discrete Fourier transform (DFT), Walsh, Reed, Solomon, gold code, etc. It should be noted that any suitable orthogonal matrix type may be used to support the disclosed operations.

Each of the one or more OCC matrices may be characterized by a size. For example, a first OCC matrix may be an N×N matrix, and a second OCC matrix may be an M×M matrix, where the second OCC matrix is relatively larger than the first OCC matrix. That is, the second OCC matrix may include longer OCC vectors and/or a higher number of OCC vectors. In some examples, the first OCC matrix and the second OCC matrix may be the same type of matrix (e.g., DFT). Here, a PHY layer between the UE 104 and the BS 102 would be relatively more secure from eavesdropping devices because those devices may not expect the use of different types of matrices, nor the use of differently sized matrices of the same type.

In one example case, the first OCC matrix may include a first number of bits, or a vector with a first number of bits (e.g., X bits, or X-bit vectors), while the second OCC matrix is relatively larger than the first OCC matrix (e.g., the second OCC matrix includes (X+Y) entries, or (X+Y)-bit vectors). In some examples, the second OCC matrix may be unique to the BS 102 and/or UE 104. In this case, a PHY layer between the UE 104 and the BS 102 would be relatively more secure from eavesdropping devices because while those devices may be configured with conventionally sized matrices, they would likely not be able to decode a PHY layer communication that is encoded by a relatively longer OCC vector, and/or an OCC vector not included in a conventionally sized matrix because the eavesdropping devices would be attempting to decode the PHY layer communication with an incorrect matrix.

At a first process 708, the BS 102 may generate a secured first index based at least in part on a first index and a first secret key. The first index may identify a particular OCC sequence or vector from an OCC matrix that the UE 104 and BS 102 may use to encode one or more signals in a communication between a UE 104 and a BS 102. The first secret key may include an indication of a security technique and/or an argument used to secure the secured first index. For example, the first secret key may indicate that the security technique is a logical operation (e.g., an exclusive OR (XOR) function or any other suitable logical operation). The first secret key may also indicate an argument that, in the case of a logical operation, may be a value used to reveal the first index when inputted into the logical operation. Equation 1 below is one example of this using an XOR operation:

$$XOR(p, k') = k \qquad \text{Equation 1}$$

Where p is the argument of the first secret key, k' is the secured first index, and k is the first index. In a multi-UE scenario where the BS 102 is communicating with multiple different UEs, the BS 102 may use the same or a different secret key for two or more UEs, and/or the same or a different index for each UE. For example, the BS 102 may configure the UEs to operate in a first mode or manner where the same secret key is used for two or more UEs and/or the same index is used for each UE, such as where enhanced security is not desired. In another example, the BS 102 may configure the UEs to operate in a second mode or manner where different secret keys are used for two or more UEs and/or a different index is used for each UE, such as where enhanced security is desired. It should be noted that any other suitable security techniques may be used to secure the PHY channel. For example, the security technique may include randomized asymmetric encryption operations and/ or public-key cryptosystems such as Rivest-Shamir-Adleman (RSA), elliptic curve cryptography (ECC), or channel reciprocity based key generation.

As discussed, the first index corresponds to a particular OCC sequence or vector from an OCC matrix that will be used as an OCC to secure communications over at least one channel between the UE 104 and the BS 102. In some examples, the OCC used to secure communications may be a time-domain OCC (TD-OCC) or a frequency-domain OCC (FD-OCC). In some cases, during the first process 708, the BS 102 may generate both a secure TD-OCC as well as a secure FD-OCC for secure communications over the at least one channel. In this example, the BS 102 generates: (i) the secured first index based at least in part on the first index (e.g., TD-OCC), and (ii) a secured second index based at least in part on a second index (e.g., FD-OCC). Both the secured first index and the secured second index may be generated by the BS 102 based on the same secret key (e.g., the first secret key). Alternatively, the secured first index may be generated based on a secret key that is different from another secret key used to generate the secured second index.

In some examples, an index (e.g., the first index and/or the second index) is an identifier of a particular OCC matrix of a plurality of OCC matrices. For example, if the BS 102 and UE 104 are configured with multiple OCC matrices, the first index may be configured to identify one of the plurality of OCC matrices, as well as a particular OCC vector in the identified matrix. In some examples, the first index may identify a first OCC matrix, and the second index may identify a second OCC matrix of the plurality of OCC matrices. For example, the first OCC matrix may be bigger than the second OCC matrix. Accordingly, BS 102 may configure the UE 104 to use the first OCC matrix if operating in a first mode or manner, such as where enhanced security is desired. In another example, BS 102 may configure the UE 104 to use the second OCC matrix if operating in a second mode or manner, such as where enhanced security is not desired.

Thus, in cases where the BS 102 generates multiple secured indices for communications between the BS 102 and a UE 104, each index of the multiple secured indices may correspond to a different matrix relative to another index of the multiple secured indices. In some examples, each index of the multiple secured indices corresponds to a different type of matrix (e.g., DFT, Walsh, Reed, Solomon, gold code, etc). Accordingly, the first index may correspond to a DFT matrix, while the second matrix corresponds to a Walsh matrix, for instance.

At a second communication 710, the BS 102 may transmit one or more secured indices and one or more corresponding secret key(s) to the UE 104, such as using higher layer protocols (e.g., RRC signaling) that have security methods. In some examples, the BS 102 may also transmit an indication of the type of matrix that corresponds to each index. For example, the BS 102 may transmit, to the UE 104, an indication of which of a first type of matrix or a second type of matrix corresponds to each index. In some examples, the indication of the type of matrix may be secured using the same secret key that secures the corresponding secured index.

At a second process 712, the UE 104 may use a secret key to decode a corresponding one or more secured indices and determine an index for an OCC. Once the OCC is determined from the index, the UE 104 and the BS 102 may communicate using the determined OCC to encode and/or decode transmissions in a third communication 714. For example, the UE 104 may use a secret key to decode: (i) a secured index, and (ii) a secured indication of the type of matrix that corresponds to the index, both of which are received from the BS 102. The indication of the type of matrix may identify a particular one of one or more matrices that the UE 104 is configured with, and the index may identify a particular OCC within the identified matrix.

Thus, communications made according to the identified matrix and OCC may prevent other devices, which are not intended participants in the third communication 714, from eavesdropping on the third communication. This is because only the UE 104 and the BS 102 are configured to properly decode signals transmitted during the third communication 714. For example, an eavesdropping device is not configured with any information unique to the physical layer signaling of the third communication 714 (e.g., a differently sized matrix, different types of matrices, and/or a secret key for one or more of identifying a particular matrix and/or identifying a particular OCC). Accordingly, even if the eavesdropping device intercepts physical layer signaling from the third communication 714, the physical layer encoding described herein may prevent the eavesdropping device from determining not only the channel used by a UE or a BS, but also which UE in a MU-MIMO environment is communicating which signals. That is, the eavesdropping device is not equipped with the unique information required to transmit or receive signaling within the third communication 714.

FIG. 8 is a flow diagram illustrating example operations 800 for wireless communication, in accordance with certain aspects of the present disclosure. The operations 800 may be performed, for example, by a BS (e.g., such as the BS 102 illustrated in FIGS. 1 and 2). The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin at a first block 810 by generating a secured first index based at least in part on a first index and a first secret key, the first index corresponding to a first orthogonal cover code (OCC) for communication over at least a first channel between the BS and a user equipment (UE).

The operations 800 may proceed to a second block 820 by transmitting, to the UE, the secured first index and the first secret key.

Optionally, the operations 800 may include a third block 830 for transmitting, to the UE, an indication of which of the first type of matrix or the second type of matrix corresponds to the first index.

Optionally, the operations 800 may include a fourth block 840 for generating the secured second index based at least in part on the first secret key.

Optionally, the operations 800 may include a fifth block 850 for transmitting, to the UE, a secured second index corresponding to the second OCC matrix.

Optionally, the operations 800 may include a sixth block 860 for transmitting, to the UE, a secured second index corresponding to a second OCC for communication over at least the first channel between the BS and the UE, wherein the first OCC is a time domain (TD) OCC and the second OCC is a frequency domain (FD) OCC.

Optionally, the operations 800 may include a seventh block 870 for transmitting, to the UE, a second secret key used to generate the secured second index.

In certain aspects, the first OCC is one of a time domain (TD) OCC or a frequency domain (FD) OCC.

In certain aspects, the first index is an identifier of a first OCC matrix of a plurality of OCC matrices.

In certain aspects, the plurality of OCC matrices comprise the first OCC matrix and a second OCC matrix, and wherein the first OCC matrix comprises a greater number of entries relative to the second OCC matrix.

In certain aspects, the first OCC matrix is a first type of matrix, and wherein a second OCC matrix of the plurality of OCC matrices is a second type of matrix.

In certain aspects, the indication is secured using the first secret key.

In certain aspects, the UE is one of a plurality of UEs in a multiple-user multiple-input multiple-output (MU-MIMO) environment.

FIG. 9 is a flow diagram illustrating example operations 900 for wireless communication, in accordance with certain aspects of the present disclosure. The operations 900 may be performed, for example, by a UE (e.g., such as the UE 104 illustrated in FIGS. 1 and 2). The operations 900 may be complementary to the operations 800 illustrated in FIG. 8 performed by the BS. The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at a first block 910, by receiving an indication of a plurality of orthogonal cover code (OCC) matrices including a first OCC matrix, wherein the first OCC matrix comprises a plurality of OCCs.

The operations 900 may proceed, at a second block 920, by receiving, from a base station (BS): a secured first index based at least in part on a first index and a first secret key, the first index corresponding to a first OCC of the plurality of OCCs for communication over at least a first channel between the BS and the UE; and the first secret key.

Optionally, the operations 900 may proceed, at a third block 930, by receiving, from the BS, a secured second index corresponding to a second OCC for communication over at least the first channel between the BS and the UE, wherein the first OCC is a time domain (TD) OCC and the second OCC is a frequency domain (FD) OCC.

Optionally, the operations 900 may proceed, at a fourth block 940, by receiving, from the BS, a second secret key used to generate the secured second index.

Optionally, the operations 900 may proceed, at a fifth block 950, by receiving, from the BS, a secured second index corresponding to the second OCC matrix.

Optionally, the operations 900 may proceed, at a sixth block 960, by receiving, from the BS, an indication of which of the first type of matrix or the second type of matrix corresponds to the first index.

In certain aspects, the first OCC is one of a time domain (TD) OCC or a frequency domain (FD) OCC.

In certain aspects, the second OCC is one of another plurality of OCCs of a second OCC matrix of the plurality of OCC matrices.

In certain aspects, the first index is an identifier of a first OCC matrix of a plurality of OCC matrices.

In certain aspects, the plurality of OCC matrices comprise the first OCC matrix and a second OCC matrix, and wherein the first OCC matrix comprises a greater number of entries relative to the second OCC matrix.

In certain aspects, the first OCC matrix is a first type of matrix, and wherein a second OCC matrix of the plurality of OCC matrices is a second type of matrix.

In certain aspects, the indication is secured using the first secret key.

In certain aspects, the UE is one of a plurality of UEs in a multiple-user multiple-input multiple-output (MU-MIMO) environment.

Example Wireless Communication Devices

Figure 10:
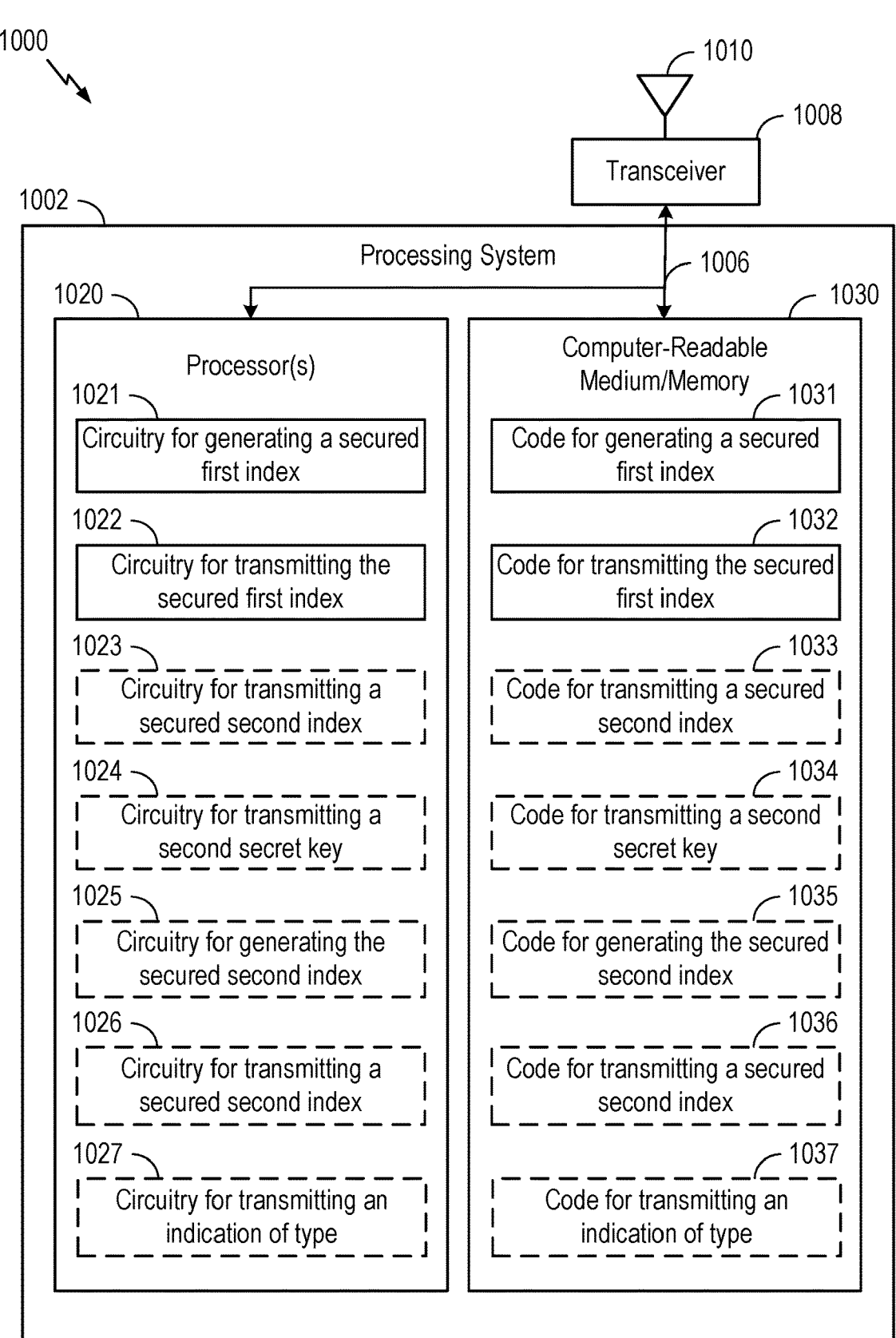
FIG. 10 is a block diagram illustrating aspects of an example communications device.

FIG. 10 is a block diagram illustrating an example communications device 1000 that includes various components operable, configured, or adapted to perform operations for the techniques disclosed herein, such as the operations depicted and described with respect to FIGS. 7 and 8. In some examples, communication device 1000 may be a base station 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS.

7 and 8, or other operations for performing the various techniques discussed herein for securing PHY layer communications.

In the illustrated example, computer-readable medium/memory 1030 stores code 1031 for generating a secured first index based at least in part on a first index and a first secret key, the first index corresponding to a first orthogonal cover code (OCC) for communication over at least a first channel between the BS and a user equipment (UE), code 1032 for transmitting, to the UE, the secured first index and the first secret key, code 1033 for transmitting, to the UE, a secured second index corresponding to a second OCC for communication over at least the first channel between the BS and the UE, wherein the first OCC is a time domain (TD) OCC and the second OCC is a frequency domain (FD) OCC, code 1034 for transmitting, to the UE, a second secret key used to generate the secured second index, code 1035 for generating the secured second index based at least in part on the first secret key, code 1036 for transmitting, to the UE, a secured second index corresponding to the second OCC matrix, and code 1037 for transmitting, to the UE, an indication of which of the first type of matrix or the second type of matrix corresponds to the first index.

In the depicted example, the one or more processors 1020 include circuitry configured to implement the code stored in the computer-readable medium/memory 1030, including circuitry 1021 for generating a secured first index based at least in part on a first index and a first secret key, the first index corresponding to a first orthogonal cover code (OCC) for communication over at least a first channel between the BS and a user equipment (UE), circuitry 1022 for transmitting, to the UE, the secured first index and the first secret key, circuitry 1023 for transmitting, to the UE, a secured second index corresponding to a second OCC for communication over at least the first channel between the BS and the UE, wherein the first OCC is a time domain (TD) OCC and the second OCC is a frequency domain (FD) OCC, circuitry 1024 for transmitting, to the UE, a second secret key used to generate the secured second index, circuitry 1025 for generating the secured second index based at least in part on the first secret key, circuitry 1026 for transmitting, to the UE, a secured second index corresponding to the second OCC matrix, and circuitry 1027 for transmitting, to the UE, an indication of which of the first type of matrix or the second type of matrix corresponds to the first index.

Various components of communications device 1000 may provide means for performing the methods described herein, including with respect to FIG. 8.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for generating a secured first index based at least in part on a first index and a first secret key, the first index corresponding to a first orthogonal cover code (OCC) for communication over at least a first channel between the BS and a user equipment (UE), and means for generating the secured second index based at least in part on the first secret key, may include various processing system components, such as: the one or more processors 1020 in FIG. 10, or aspects of the base station 102 depicted in FIG.

2, including receive processor 238, transmit processor 220, TX MIMO processor 230, and/or controller/processor 240 (including the PHY security module 199).

Notably, FIG. 10 is an example, and many other examples and configurations of communication device 1000 are possible.

Figure 11:
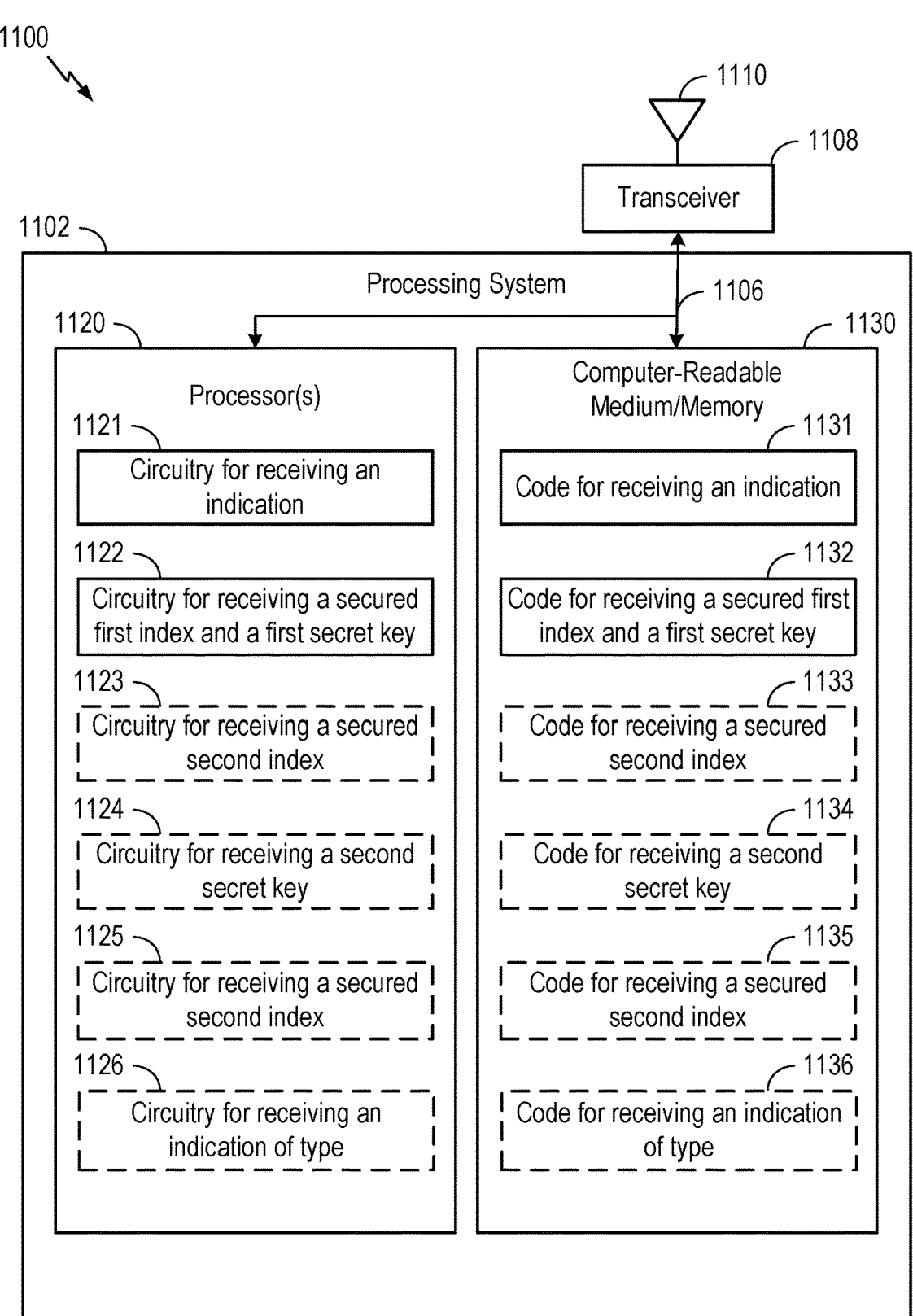
FIG. 11 is a block diagram illustrating aspects of an example communications device.

FIG. 11 is a block diagram illustrating an communications device 1100 that includes various components operable, configured, or adapted to perform operations for the techniques disclosed herein, such as the operations depicted and described with respect to FIGS. 7 and 9. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7 and 9, or other operations for performing the various techniques discussed herein for securing PHY layer communications.

In the depicted example, computer-readable medium/memory 1130 stores code 1131 for receiving an indication of a plurality of orthogonal cover code (OCC) matrices including a first OCC matrix, wherein the first OCC matrix comprises a plurality of OCCs, code 1132 for receiving, from a base station (BS): a secured first index based at least in part on a first index and a first secret key, the first index corresponding to a first OCC of the plurality of OCCs for communication over at least a first channel between the BS and the UE; and the first secret key, code 1133 for receiving, from the BS, a secured second index corresponding to a second OCC for communication over at least the first channel between the BS and the UE, wherein the first OCC is a time domain (TD) OCC and the second OCC is a frequency domain (FD) OCC, code 1134 for receiving, from the BS, a second secret key used to generate the secured second index, code 1135 for receiving, from the BS, a secured second index corresponding to the second OCC matrix, code 1136 for receiving, from the BS, an indication of which of the first type of matrix or the second type of matrix corresponds to the first index.

In the depicted example, the one or more processors 1120 include circuitry configured to implement the code stored in the computer-readable medium/memory 1130, including circuitry 1121 for receiving an indication of a plurality of orthogonal cover code (OCC) matrices including a first OCC matrix, wherein the first OCC matrix comprises a plurality of OCCs, circuitry 1122 for receiving, from a base station (BS): a secured first index based at least in part on a first index and a first secret key, the first index corresponding to a first OCC of the plurality of OCCs for communication over at least a first channel between the BS and the UE; and the first secret key, circuitry 1123 for receiving, from the BS, a secured second index corresponding to a second OCC for communication over at least the first channel between the BS and the UE, wherein the first OCC is a time domain (TD) OCC and the second OCC is a frequency domain (FD) OCC, circuitry 1124 for receiving, from the BS, a second secret key used to generate the secured second index, circuitry 1125 for receiving, from the BS, a secured second index corresponding to the second OCC matrix, circuitry 1126 for receiving, from the BS, an indication of which of the first type of matrix or the second type of matrix corresponds to the first index.

Various components of communications device 1100 may provide means for performing the methods described herein, including with respect to FIG. 9.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna (s) 252 of the user equipment 104 illustrated in FIG. 2 and/or transceiver 1108 and antenna 1110 of the communication device 1100 in FIG. 11.

In some examples, means for decoding may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including the PHY security module 198).

Notably, FIG. 11 is an example, and many other examples and configurations of communication device 1100 are possible.

Example Clauses

Implementation examples are described in the following numbered clauses:

Clause 1: A method for wireless communication by a base station (BS), the method comprising: generating a secured first index based at least in part on a first index and a first secret key, the first index corresponding to a first orthogonal cover code (OCC) for communication over at least a first channel between the BS and a user equipment (UE); and transmitting, to the UE, the secured first index and the first secret key.

Clause 2. The method of Clause 1, wherein the first OCC is one of a time domain (TD) OCC or a frequency domain (FD) OCC.

Clause 3. The method of any of Clauses 1 and 2, further comprising transmitting, to the UE, a secured second index corresponding to a second OCC for communication over at least the first channel between the BS and the UE, wherein the first OCC is a time domain (TD) OCC and the second OCC is a frequency domain (FD) OCC.

Clause 4. The method of any of Clauses 1-3, further comprising transmitting, to the UE, a second secret key used to generate the secured second index.

Clause 5. The method of any of Clauses 1-4, further comprising generating the secured second index based at least in part on the first secret key.

Clause 6. The method of any of Clauses 1-5, wherein the first index is an identifier of a first OCC matrix of a plurality of OCC matrices.

Clause 7. The method of any of Clauses 1-6, wherein the plurality of OCC matrices comprise the first OCC matrix and a second OCC matrix, and wherein the first OCC matrix comprises a greater number of entries relative to the second OCC matrix.

Clause 8. The method of any of Clauses 1-7, further comprising transmitting, to the UE, a secured second index corresponding to the second OCC matrix.

Clause 9. The method of any of Clauses 1-8, wherein the first OCC matrix is a first type of matrix, and wherein a second OCC matrix of the plurality of OCC matrices is a second type of matrix.

Clause 10. The method of any of Clauses 1-9, further comprising transmitting, to the UE, an indication of which of the first type of matrix or the second type of matrix corresponds to the first index.

Clause 11. The method of any of Clauses 1-10, wherein the indication is secured using the first secret key.

Clause 12. The method of any of Clauses 1-11, wherein the UE is one of a plurality of UEs in a multiple-user multiple-input multiple-output (MU-MIMO) environment.

Clause 13. A method for wireless communication by a user equipment (UE), the method comprising: receiving an indication of one or more orthogonal cover code (OCC) matrices including a first OCC matrix, wherein the first OCC matrix comprises a plurality of OCCs; and receiving, from a base station (BS): a secured first index based at least in part on a first index and a first secret key, the first index corresponding to a first OCC of the plurality of OCCs for communication over at least a first channel between the BS and the UE; and the first secret key.

Clause 14. The method of Clause 13, wherein the first OCC is one of a time domain (TD) OCC or a frequency domain (FD) OCC.

Clause 15. The method of any of Clauses 13 and 14, further comprising receiving, from the BS, a secured second index corresponding to a second OCC for communication over at least the first channel between the BS and the UE, wherein the first OCC is a time domain (TD) OCC and the second OCC is a frequency domain (FD) OCC.

Clause 16. The method of any of Clauses 13-15, wherein the second OCC is one of another plurality of OCCs of a second OCC matrix of the one or more OCC matrices.

Clause 17. The method any of Clauses 13-16, further comprising receiving, from the BS, a second secret key used to generate the secured second index.

Clause 18. The method of any of Clauses 13-17, wherein the first index is an identifier of a first OCC matrix of the one or more OCC matrices.

Clause 19. The method of any of Clauses 13-18, wherein the one or more OCC matrices comprise the first OCC matrix and a second OCC matrix, and wherein the first OCC matrix comprises a greater number of entries relative to the second OCC matrix.

Clause 20. The method of any of Clauses 13-19, further comprising receiving, from the BS, a secured second index corresponding to the second OCC matrix.

Clause 21. The method of any of Clauses 13-20, wherein the first OCC matrix is a first type of matrix, and wherein a second OCC matrix of the one or more OCC matrices is a second type of matrix.

Clause 22. The method of any of Clauses 13-21, further comprising receiving, from the BS, an indication of which of the first type of matrix or the second type of matrix corresponds to the first index.

Clause 23. The method of any of Clauses 13-22, wherein the indication is secured using the first secret key.

Clause 24. The method of any of Clauses 13-23, wherein the UE is one of a plurality of UEs in a multiple-user multiple-input multiple-output (MU-MIMO) environment.

Clause 25. A base station (BS), comprising: a memory; and a processor coupled to the memory, the processor and the memory configured to: generate a secured first index based at least in part on a first index and a first secret key, the first index corresponding to a first orthogonal cover code (OCC) for communication over at least a first channel between the BS and a user equipment (UE); and transmit, to the UE, the secured first index and the first secret key.

Clause 26. The BS of Clause 25, wherein the first OCC is one of a time domain (TD) OCC or a frequency domain (FD) OCC.

Clause 27. The BS of any of Clauses 25 and 26, wherein the processor and the memory are further configured to transmit, to the UE, a secured second index corresponding to a second OCC for communication over at least the first channel between the BS and the UE, wherein the first OCC is a time domain (TD) OCC and the second OCC is a frequency domain (FD) OCC.

Clause 28. A user equipment (UE), comprising: a memory; and a processor coupled to the memory, the processor and the memory configured to: receive an indication of one or more orthogonal cover code (OCC) matrices including a first OCC matrix, wherein the first OCC matrix comprises a plurality of OCCs; and receive, from a base station (BS): a secured first index based at least in part on a first index and a first secret key, the first index corresponding to a first OCC of the plurality of OCCs for communication over at least a first channel between the BS and the UE; and the first secret key.

Clause 29. The UE of Clause 28, wherein the first OCC is one of a time domain (TD) OCC or a frequency domain (FD) OCC.

Clause 30. The UE of any of Clauses 28 and 29, wherein the processor and the memory configured to receive, from the BS, a secured second index corresponding to a second OCC for communication over at least the first channel between the BS and the UE, wherein the first OCC is a time domain (TD) OCC and the second OCC is a frequency domain (FD) OCC.

Clause 31: An apparatus, comprising: a memory comprising executable instructions; one or more processors configured to execute the executable instructions and cause the apparatus to perform a method in accordance with any one of Clauses 1-12.

Clause 32: An apparatus, comprising: a memory comprising executable instructions; one or more processors configured to execute the executable instructions and cause the apparatus to perform a method in accordance with any one of Clauses 13-24.

Clause 33: An apparatus, comprising means for performing a method in accordance with any one of Clauses 1-12.

Clause 34: An apparatus, comprising means for performing a method in accordance with any one of Clauses 13-24.

Clause 35: A non-transitory computer-readable medium comprising executable instructions that, when executed by one or more processors of an apparatus, cause the apparatus to perform a method in accordance with any one of Clauses 1-12.

Clause 36: A non-transitory computer-readable medium comprising executable instructions that, when executed by one or more processors of an apparatus, cause the apparatus to perform a method in accordance with any one of Clauses 13-24.

Clause 37: A computer program product embodied on a computer-readable storage medium comprising code for performing a method in accordance with any one of Clauses 1-12.

Clause 38: A computer program product embodied on a computer-readable storage medium comprising code for performing a method in accordance with any one of Clauses 13-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (p) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2p slots/subframe. The subcarrier spacing and symbol length/duration are a function of the numerology. The subcarrier spacing may be equal to 2×15 kHz, where is the numerology 0 to 5. As such, the numerology p=0 has a subcarrier spacing of 15 kHz and the numerology p=5 has a subcarrier spacing of 480 kHz. The symbol length/duration is inversely related to the subcarrier spacing. FIGS. 3A-3D provide an example of slot configuration 0 with 14 symbols per slot and numerology p=2 with 4 slots per subframe. The slot duration is 0.25 ms, the subcarrier spacing is 60 kHz, and the symbol duration is approximately 16.67 s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/ symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment (ACK) or negative acknowledgment (NACK) feedback. The PUSCH carries data, and may additionally be used to carry a buffer status report (BSR), a power headroom report (PHR), and/or UCI.

Additional Considerations

The preceding description provides examples for securing PHY layers in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, and others. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A base station (BS), comprising:
one or more memories comprising instructions; and
one or more processors, individually or collectively, configured to execute the instructions to cause the BS to:
transmit an indication of one or more orthogonal cover code (OCC) matrices including a first OCC matrix, wherein the first OCC matrix comprises a plurality of OCCs;

generate a secured first index based at least in part on a first index and a first secret key, the first index corresponding to a first OCC of the plurality of OCCs for communication over at least a first channel between the BS and a user equipment (UE);

transmit, to the UE, the secured first index and the first secret key for decoding one or more transmissions from the BS that are based on the first OCC; and transmit a downlink transmission to the UE that is encoded based on the first OCC.

2. The BS of claim 1, wherein the first OCC is one of a time domain (TD) OCC or a frequency domain (FD) OCC.

3. The BS of claim 1, wherein the one or more processors, individually or collectively, are configured to execute the instructions to cause the BS to transmit to the UE a secured second index corresponding to a second OCC for communication over at least the first channel between the BS and the UE, wherein the first OCC is a time domain (TD) OCC and the second OCC is a frequency domain (FD) OCC.

4. The BS of claim 3, wherein the one or more processors, individually or collectively, are configured to execute the instructions to cause the BS to transmit to the UE a second secret key used to generate the secured second index.

5. The BS of claim 3, wherein the one or more processors, individually or collectively, are configured to execute the instructions to cause the BS to generate the secured second index based at least in part on the first secret key.

6. The BS of claim 1, wherein the first index is an identifier of the first OCC matrix of the one or more OCC matrices.

7. The BS of claim 6, wherein the one or more OCC matrices comprise the first OCC matrix and a second OCC matrix, and wherein the first OCC matrix comprises a greater number of entries relative to the second OCC matrix.

8. The BS of claim 7, wherein the one or more processors, individually or collectively, are configured to execute the instructions to cause the BS to transmit to the UE a secured second index corresponding to the second OCC matrix.

9. The BS of claim 6, wherein the first OCC matrix is a first type of matrix, and wherein a second OCC matrix of the one or more OCC matrices is a second type of matrix.

10. The BS of claim 9, wherein the one or more processors, individually or collectively, are configured to execute the instructions to cause the BS to transmit to the UE an indication of which of the first type of matrix or the second type of matrix corresponds to the first index.

11. The BS of claim 10, wherein the indication is secured using the first secret key.

12. The BS of claim 1, wherein the UE is one of a plurality of UEs in a multiple-user multiple-input multiple-output (MU-MIMO) environment.

13. A user equipment (UE), comprising:
one or more memories comprising instructions; and
one or more processors, individually or collectively, configured to execute the instructions to cause the UE to:
receive an indication of one or more orthogonal cover code (OCC) matrices including a first OCC matrix, wherein the first OCC matrix comprises a plurality of OCCs;
receive, from a base station (BS) a secured first index based at least in part on a first index and a first secret key, the first index corresponding to a first OCC of the plurality of OCCs for communication over at least a first channel between the BS and the UE and the first secret key for encoding one or more transmissions to the BS that are based on the first OCC; and transmit an uplink transmission to the BS that is encoded based on the first OCC.

14. The UE of claim 13, wherein the first OCC is one of a time domain (TD) OCC or a frequency domain (FD) OCC.

15. The UE of claim 13, wherein the one or more processors, individually or collectively, are configured to execute the instructions to cause the UE to receive from the BS a secured second index corresponding to a second OCC for communication over at least the first channel between the BS and the UE, wherein the first OCC is a time domain (TD) OCC and the second OCC is a frequency domain (FD) OCC.

16. The UE of claim 15, wherein the second OCC is one of another plurality of OCCs of a second OCC matrix of the one or more OCC matrices.

17. The UE of claim 16, wherein the one or more processors, individually or collectively, are configured to execute the instructions to cause the UE to receive from the BS a second secret key used to generate the secured second index.

18. The UE of claim 13, wherein the first index is an identifier of the first OCC matrix of the one or more OCC matrices.

19. The UE of claim 18, wherein the one or more OCC matrices comprise the first OCC matrix and a second OCC matrix, and wherein the first OCC matrix comprises a greater number of entries relative to the second OCC matrix.

20. The UE of claim 19, wherein the one or more processors, individually or collectively, are configured to execute the instructions to cause the UE to receive from the BS a secured second index corresponding to the second OCC matrix.

21. The UE of claim 18, wherein the first OCC matrix is a first type of matrix, and wherein a second OCC matrix of the one or more OCC matrices is a second type of matrix.

22. The UE of claim 21, wherein the one or more processors, individually or collectively, are configured to execute the instructions to cause the UE to receive from the BS an indication of which of the first type of matrix or the second type of matrix corresponds to the first index.

23. The UE of claim 22, wherein the indication is secured using the first secret key.

24. The UE of claim 13, wherein the UE is one of a plurality of UEs in a multiple-user multiple-input multiple-output (MU-MIMO) environment.

25. A method for wireless communication by a base station (BS), comprising:
transmitting an indication of one or more orthogonal cover code (OCC) matrices including a first OCC matrix, wherein the first OCC matrix comprises a plurality of OCCs;
generating a secured first index based at least in part on a first index and a first secret key, the first index corresponding to a first OCC of the plurality of OCCs for communication over at least a first channel between the BS and a user equipment (UE);
transmitting, to the UE, the secured first index and the first secret key for decoding one or more transmissions from the BS that are based on the first OCC; and
transmitting a downlink transmission to the UE that is encoded based on the first OCC.

26. The method of claim 25, wherein the first OCC is one of a time domain (TD) OCC or a frequency domain (FD) OCC.

27. The method of claim 25, further comprising transmitting, to the UE, a secured second index corresponding to a second OCC for communication over at least the first channel between the BS and the UE, wherein the first OCC is a time domain (TD) OCC and the second OCC is a frequency domain (FD) OCC.

28. A method for wireless communication by a user equipment (UE), comprising:

receiving an indication of one or more orthogonal cover code (OCC) matrices including a first OCC matrix, wherein the first OCC matrix comprises a plurality of OCCs; and receiving, from a base station (BS) a secured first index based at least in part on a first index and a first secret key, the first index corresponding to a first OCC of the plurality of OCCs for communication over at least a first channel between the BS and the UE and the first secret key for encoding one or more transmissions to the BS that are based on the first OCC; and transmitting an uplink transmission to the BS that is encoded based on the first OCC.

29. The method of claim 28, wherein the first OCC is one of a time domain (TD) OCC or a frequency domain (FD) OCC.

30. The method of claim 28, further comprising receiving, from the BS, a secured second index corresponding to a second OCC for communication over at least the first channel between the BS and the UE, wherein the first OCC is a time domain (TD) OCC and the second OCC is a frequency domain (FD) OCC.

\* \* \* \* \*